(12) United States Patent
Morris

(10) Patent No.: US 8,870,723 B2
(45) Date of Patent: Oct. 28, 2014

(54) VARIABLE RESISTANCE PULLEY FOR BODY-WEIGHT ROTATION EXERCISE

(76) Inventor: Nicholas Morris, Redondo Beach, CA (US)

(*) Notice: Subject to any disclaimer, the term of this patent is extended or adjusted under 35 U.S.C. 154(b) by 605 days.

(21) Appl. No.: 13/109,664

(22) Filed: May 17, 2011

(65) Prior Publication Data

US 2011/0287906 A1 Nov. 24, 2011

Related U.S. Application Data

(60) Provisional application No. 61/395,847, filed on May 17, 2010.

(51) Int. Cl.
| | | |
|---|---|---|
| A63B 21/00 | (2006.01) |
| A63B 7/00 | (2006.01) |
| A63B 21/015 | (2006.01) |
| A63B 21/062 | (2006.01) |
| A63B 23/035 | (2006.01) |
| F01B 7/02 | (2006.01) |
| F02B 23/06 | (2006.01) |
| F02B 75/28 | (2006.01) |
| G06F 1/16 | (2006.01) |
| A63B 71/00 | (2006.01) |

(52) U.S. Cl.
CPC .................. *A63B 7/00* (2013.01); *A63B 21/015* (2013.01); *A63B 21/062* (2013.01); *A63B 21/1484* (2013.01); *A63B 23/0355* (2013.01); *F01B 7/02* (2013.01); *F02B 23/0645* (2013.01); *F02B 75/28* (2013.01); *G06F 1/1626* (2013.01); *A63B 21/00069* (2013.01); *A63B 21/1469* (2013.01); *A63B 71/0054* (2013.01); *A63B 2220/17* (2013.01); *A63B 2225/20* (2013.01); *A63B 2225/50* (2013.01); *A63B 2230/06* (2013.01)
USPC ........................................... 482/126; 482/121

(58) Field of Classification Search
USPC .......... 482/121, 126, 148, 904, 907, 122, 123, 482/124
See application file for complete search history.

(56) References Cited

U.S. PATENT DOCUMENTS

| | | | |
|---|---|---|---|
| 1,572,281 A * | 2/1926 | Fry | 482/118 |
| 5,048,825 A * | 9/1991 | Kelly | 482/94 |
| 5,234,394 A | 8/1993 | Wilkinson | |
| 7,044,896 B2 | 5/2006 | Hetrick | |
| 2005/0148437 A1 | 7/2005 | Ryan et al. | |

* cited by examiner

*Primary Examiner* — Jerome w Donnelly
(74) *Attorney, Agent, or Firm* — Superior IP, PLLC; Dustin L. Call

(57) ABSTRACT

One example embodiment includes a pulley for providing resistance in an exercise system. The pulley includes a wheel, where the wheel is configured to rotate about an axis, and includes a groove, where the groove is located along the circumference of the wheel. The pulley also includes a cable, where the cable makes contact with at least a portion of the groove. The pulley further includes a resistance adjustment, where the resistance adjustment is configured to change the force required to rotate the wheel about the axis.

18 Claims, 4 Drawing Sheets

VARIABLE RESISTANCE PULLEY FOR BODY-WEIGHT ROTATION EXERCISE

CROSS-REFERENCE TO RELATED APPLICATIONS

This application claims the benefit of and priority to U.S. Provisional Patent Application Ser. No. 61/395,847 filed on May 17, 2010, which application is incorporated herein by reference in its entirety.

This application is related to co-pending U.S. application Ser. No. 13/109,652, filed on May 17, 2011, and entitled, "VARIABLE RESISTANCE FITNESS CHAMBER FOR ROTATIONAL TORQUE", which application is incorporated herein by reference in its entirety.

Co-pending U.S. application Ser. No. 13/109,652, filed on May 17, 2011, and entitled, "VARIABLE RESISTANCE FITNESS CHAMBER FOR ROTATIONAL TORQUE" claims the benefit of and priority to U.S. Provisional Patent Application Ser. No. 61/395,784 filed on May 17, 20101, which application is incorporated herein by reference in its entirety.

This application is related to co-pending U.S. application Ser. No. 13/109,654, filed on May 17, 2011, and entitled, "BALL NEST WITH VARIABLE RESISTANCE FOR FITNESS AND WELLNESS MOVEMENT", which application is incorporated herein by reference in its entirety.

Co-pending U.S. application Ser. No. 13/109,654, filed on May 17, 2011, and entitled, "BALL NEST WITH VARIABLE RESISTANCE FOR FITNESS AND WELLNESS MOVEMENT" claims the benefit of and priority to U.S. Provisional Patent Application Ser. No. 61/395,823 filed on May 17, 2010, which application is incorporated herein by reference in its entirety.

This application is related to co-pending U.S. application Ser. No. 13/109,658, filed on May 17, 2011, and entitled, "VERTICAL MOVEMENT VIBRATING EXERCISE AND WELLNESS PLATFORM", which application is incorporated herein by reference in its entirety.

Co-pending U.S. application Ser. No. 13/109,658 filed on May 17, 2011, and entitled, "VERTICAL MOVEMENT VIBRATING EXERCISE AND WELLNESS PLATFORM" claims the benefit of and priority to U.S. Provisional Patent Application Ser. No. 61/395,819 filed on May 17, 2010, which application is incorporated herein by reference in its entirety.

This application is related to co-pending U.S. application Ser. No. 13/109,662, filed on May 17, 2011, and entitled, "VARIABLE-RESISTANCE FUNCTIONAL FITNESS BAG", which application is incorporated herein by reference in its entirety.

Co-pending U.S. application Ser. No. 13/109,662, filed on May 17, 2011, and entitled, "VARIABLE-RESISTANCE FUNCTIONAL FITNESS BAG" claims the benefit of and priority to U.S. Provisional Patent Application Ser. No. 61/395,822 filed on May 17, 2010, which application is incorporated herein by reference in its entirety.

This application is related to co-pending U.S. application Ser. No. 13/109,666, filed on May 17, 2011, and entitled, "TRI-CIRCULAR EXERCISE DEVICE WITH VARIABLE ROTATION RESISTANCE", which application is incorporated herein by reference in its entirety.

Co-pending U.S. application Ser. No. 13/109,666, filed on May 17, 2011, and entitled, "TRI-CIRCULAR EXERCISE DEVICE WITH VARIABLE ROTATION RESISTANCE" claims the benefit of and priority to U.S. Provisional Patent Application Ser. No. 61/395,817 filed on May 17, 2010, which application is incorporated herein by reference in its entirety.

BACKGROUND OF THE INVENTION

The benefits of exercise are numerous and well documented. For example, exercise can reduce the instance and severity of many diseases. In addition, exercise can make a person feel better about themselves and provide the user with increased self-confidence and feelings of self-worth. However, many would be exercisers are intimidated by complex fitness machines and uncomfortable and unnatural motions associated with exercising. In addition, they may be reluctant to use heavy weights which can cause injury to the user.

Fitness machines have been made in the past that eliminate the heavy weights by using resistance within materials, such as elastic materials. These can allow the user to vary resistance. However, this creates the side effect of creating "reactive-force". I.e., as the user performs the exercise movement, the resistance being used causes a reaction force into the user's body. The greater the resistance, the greater the reactive force.

Reactive force can cause damage to the user's body if the resistance is too strong for a user and the exercise movement becomes uncontrolled. Additionally reactive force can also accumulate a "break-down" effect in the ligaments, tendons or other soft tissues in the exercising user, and their associated muscle groups. Further, reactive force is a dissipated energy, and means less than optimal result to the exerciser, meaning a poor return on time and effort invested in the exercise.

Additionally, many exercise systems allow only a single resistance setting. I.e., the system allows for a single exercise at a single resistance. This does not allow the exercise system to be used by individuals of different fitness levels. In particular, some individuals will be too new to exercising to use the exercise system while other individuals will be too advanced. Only the small group in the middle will be able to use the system.

In addition, elastic materials can rebound if the material fails. I.e., as the elastic material is stretched, the force is stored in the material. When the material fails the force in the material can cause sudden and unpredictable movement, which has potential to injure the user or damage the equipment. This is an inherent danger of the materials and the ability to reduce or eliminate this danger is very limited.

Further, many exercise systems use unnatural movements. I.e., they involve movements that the user does not perform when not doing that particular exercise. These unnatural movements can cause injury to the user. Often, the user will not even be aware of the injury until it becomes a major injury because they do not perform that movement unless exercising.

Accordingly, there is a need in the art for an exercise system which uses resistance that is not produced by elastic materials. Additionally, there is a need in the art for the exercise system to allow the user to select from variable resistance. Further, there is a need in the art for the system to prevent reactive forces from entering the user's body. Moreover there is a need for the exercise system to allow the user to exercise using natural movements.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a pulley for providing resistance in an exercise system. The pulley includes a wheel, where the wheel is configured to rotate about an axis, and includes a groove, where the groove is located along the circumference of the wheel. The pulley also includes a cable, where the cable makes contact with at least a portion of the groove. The pulley further includes a resistance adjustment, where the resistance adjustment is configured to change the force required to rotate the wheel about the axis.

Another example embodiment includes a system for allowing a user to exercise. The system includes a pulley and a resistance adjustment, where the resistance adjustment is configured to change the force required to rotate the pulley. The system also includes a cable, where the cable makes contact with at least part of the pulley, and a sling. The sling is attached to a first end of the cable and includes a support, where at least a portion of the support forms a loop. The system also includes an attachment, where the attachment is configured to connect the pulley to an external structure.

Another example embodiment includes a system for allowing a user to exercise. The system includes a pulley. The pulley includes a wheel, where the wheel is configured to rotate about an axis, and includes a groove, where the groove is located along the circumference of the wheel. The pulley also includes a resistance adjustment, where the resistance adjustment is configured to change the force required to rotate the wheel about the axis. The system also includes a cable, where the cable makes contact with at least a portion of the groove. The system further includes a first sling. The first sling is attached to a first end of the cable and includes a support, where at least a portion of the support forms a loop. The first sling also includes a body, where the body is attached to the loop formed by the support. The system additionally includes a second sling. The second sling is attached to a second end of the cable and includes a support, where at least a portion of the support forms a loop. The second sling also includes a body, where the body is attached to the loop formed by the support. The system also includes a spring, where the spring is attached to the pulley, and an extension strap, where the extension strap is attached to the spring. The system further includes a secondary attachment, where the secondary attachment is configured to connect the extension strap to an external structure.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
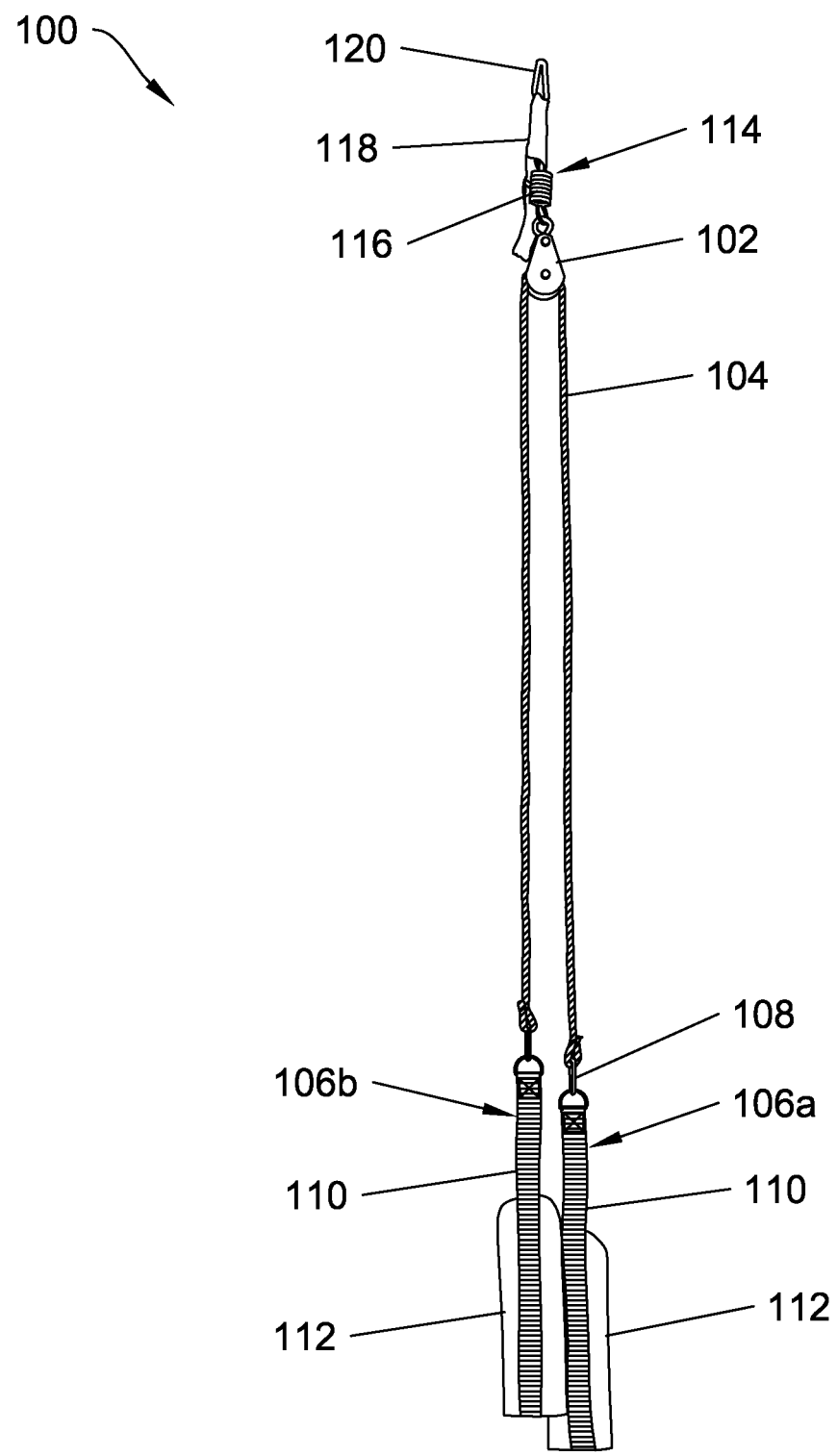
FIG. 1 illustrates an example of an exercise system.

FIG. 1 illustrates an example of an exercise system 100. In at least one implementation, the exercise system 100 can be used to increase the physical fitness of a user. In particular, the exercise system 100 can allow the user to perform a variety of movements with varying resistance. The resistance can be provided through friction rather than elasticity which reduces or eliminates the reactive force transmitted to the user's body. I.e., the exercise system 100 can increase the user's physical fitness with a reduced chance of injury.

FIG. 1 shows that the exercise system 100 can include a pulley 102. In at least one implementation, the pulley 102 can allow a force applied by the user in a first direction to be redirected in a second direction. An ideal pulley 102 would not add any force to the forces applied by the user. However, resistance can be added by making rotation of the pulley 102 more difficult, as described below. This can allow the user to vary the resistance of the exercise system 100.

FIG. 1 also shows that the exercise system 100 can also include a cable 104. In at least one implementation, the cable 104 can move along the pulley 102. In particular, the user can apply a force to one end of the cable 104. The pulley 102 can redirect the force back to the user at the other end of the cable 104. Therefore, if the user moves one end of the cable 104, he/she can simultaneously resist the movement at the other end. Additionally or alternatively, the user can connect an external device which can provide resistance.

In at least one implementation, the cable 104 can include any material of sufficient strength to resist the forces applied by the user. For example, the cable 104 can be made of metal strands, ropes, nylon or any other material. Additionally or alternatively, the cable 104 can be of sufficient length to give the user freedom of movement. For example, the cable 104 can be between 2.1 and 3.3 meters long. E.g., the cable 104 can be approximately 2.7 meters long. As used in the specification and the claims, the term approximately shall mean that the value is within 10% of the stated value, unless otherwise specified.

FIG. 1 further shows that the exercise system 100 can include a first sling 106a and a second sling 106b (collectively "sling 106" or "slings 106"). In at least one implementation, the slings 106 can be attached to the ends of the cable 104. The user can use the slings 106 to apply force to the cable 104. For example, the user can hold the cable 104 in his/her hands or can place a body part in the sling 106, such as a foot or leg in the sling 106.

FIG. 1 additionally shows that the exercise system 100 can include an attachment 108. In at least one implementation, the attachment 108 can connect the sling 106 to the cable 104. For example, the attachment 108 can include a clip and ring. The clip can be any device capable of hooking to the ring on the sling 106. For example, the hook can include a carabiner or other similar device.

FIG. 1 also shows that the sling 106 can include a support 110. In at least one implementation, the support 110 can be configured to support the forces applied to the sling 106. In particular, the support 110 can be sufficiently strong to resist the forces of the user's exercise routine. For example, the support 110 can include a loop which allows the user to grip the support 110 or place a body part in the support 110. The support 110 can be of sufficient length and width to allow the user to use the sling 106. For example, the support 110 can be between 39 centimeters and 49 centimeters long and 3 centimeters and 5 centimeters wide. E.g., the support 110 can be approximately 44 centimeters long and 4 centimeters wide.

FIG. 1 further shows that the sling 106 can include a body 112. In at least one implementation, the body 112 can increase the user's comfort. In particular, the body 112 can cover at least part of the loop created by the support 110. The body 112 can be wider and softer than the support 110. This can allow the forces to be spread out over the user's body, lowering the chances of injury to the user. For example, the body 112 can be between 30 centimeters and 38 centimeters long and 8 centimeters and 12 centimeters wide. E.g., the body 112 can be approximately 34 centimeters long and 10 centimeters wide.

FIG. 1 additionally shows that the exercise system 100 can include an external attachment 114. In at least one implementation, the external attachment 114 can allow the pulley 102 to be mounted on an external device. Mounting the pulley 102 to an external device can allow the user to change the direction of the movement of the slings 106 in the exercise routine.

FIG. 1 also shows that the external attachment 114 can include a spring 116. In at least one implementation, the spring 116 can provide additional resistance to the exercise system 100. In particular, as a user performs the exercise routine, the spring 116 can allow limited movement of the pulley 102 toward the user. However, the spring 116 will provide a resistive force to the movement, increasing the difficulty of the user's exercise routine. Additionally or alternatively, the spring 116 can increase the user's comfort. In particular, the spring 116 can add some "give" to the exercise system 100.

FIG. 1 further shows that the external attachment 114 can include an extension strap 118. In at least one implementation, the extension strap 118 can allow the user to select the position of the pulley 102. For example, the extension strap 118 can allow the user to attach the pulley 102 to a wall, ceiling or other structure. Additionally or alternatively, the extension strap 118 can allow the user to vary the angle of the pulley 102. For example, the extension strap 118 can allow the user to change the angle of the pulley 102 relative to an external structure.

FIG. 1 additionally shows that the external attachment 114 can include a secondary attachment 120. In at least one implementation, the secondary attachment 120 can allow the user to connect the extension strap 118 to an external structure. The secondary attachment 120 can include a hoop, a loop, a carabiner or any other structure configured to allow the connection of the exercise system 100 to an external structure.

In at least one implementation, the exercise system 100 can be configured to electronically communicate with an external device. For example, the exercise system 100 can be connected to a computer, a smart phone, a gaming console or any other electronic device. The electronic device can monitor the user's movements and/or the effectiveness of the user's exercise routine. For example, the electronic device can measure the user's heart rate or provide feedback for the user's exercise routine. E.g., the electronic device can monitor the motion of the various parts of the exercise system 100 and inform the user regarding motion that is overextended or underextended or regarding motion that includes starts and stops or interruptions to the user's exercise routine. Additionally or alternatively, the electronic device can provide information over numerous exercise sessions or routines. For example, the electronic device can show the user's progress as the user increases in strength and health.

The exercise system 100 can connect to the external device using any communications means. For example, the exercise system 100 can be physically connected or can be wirelessly connected to the external device. Additionally or alternatively, the exercise system 100 can connect to the external device using a network. The network exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network includes one or more cellular RF networks and/or one or more wired and/or wireless networks such as, but not limited to, 802.xx networks, Bluetooth access points, wireless access points, IP-based networks, or the like. For example, the network can include cloud based networking and computing. The network can also include servers that enable one type of network to interface with another type of network.

Figures 2A, 2B:
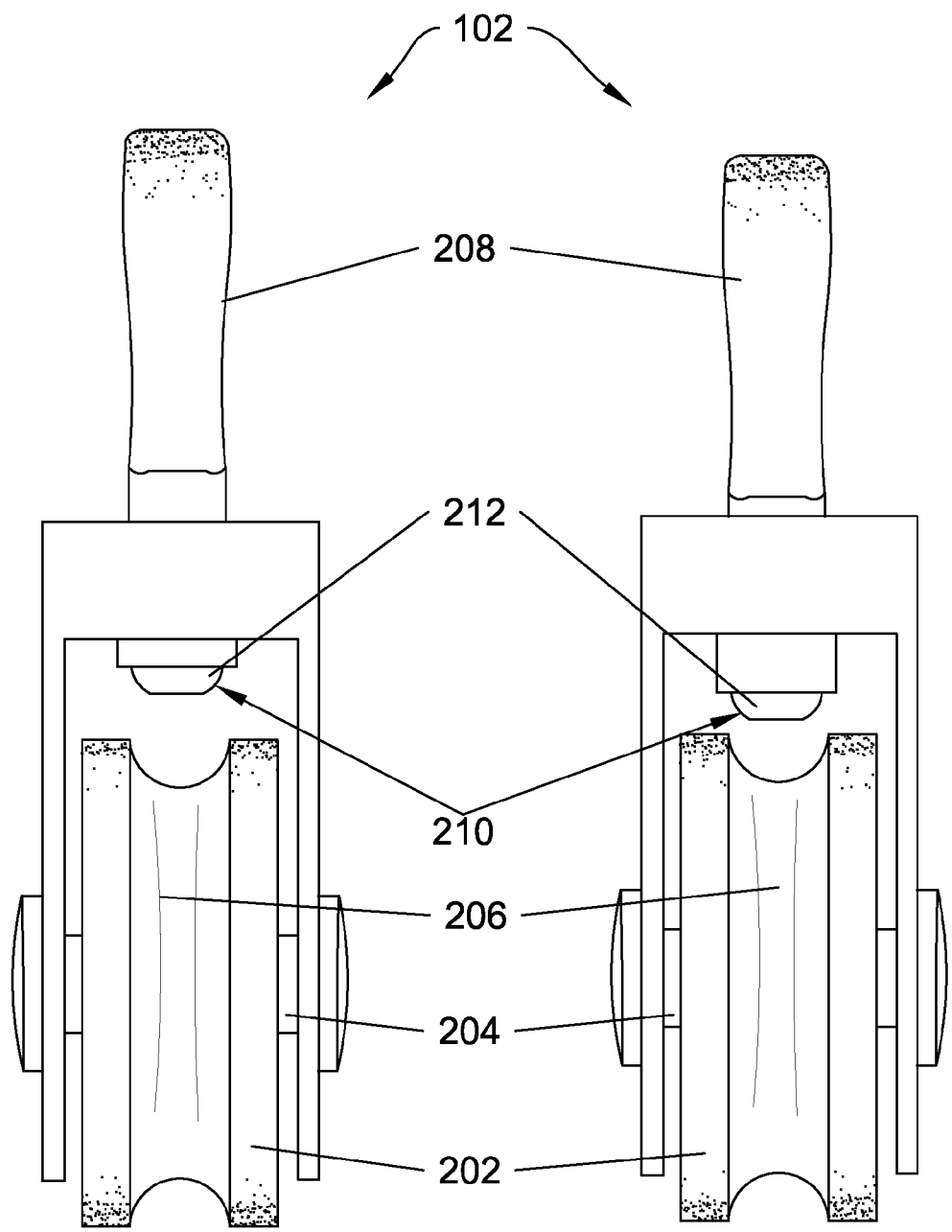
FIG. 2A illustrates an example of a pulley with low resistance.
FIG. 2B illustrates an example of a pulley with high resistance.

FIGS. 2A and 2B illustrate an example of a pulley 102. FIG. 2A illustrates an example of a pulley 102 with low resistance; and FIG. 2B illustrates an example of a pulley 102 with high resistance. In at least one implementation, the pulley 102 can be used as part of an exercise system. In particular, the pulley 102 can redirect forces applied by the user back to the user and/or provide resistance to the user's movement. I.e., the pulley 102 can allow the user to impart additional force to the user's own movement.

FIGS. 2A and 2B show that the pulley 102 can include a wheel 202. In at least one implementation, the wheel 202 can rotate about an axle 204. The rotation of the wheel 102 can, in turn, allow a connected to device to move. For example, a cable can be in contact with the wheel 102 such that movement of the cable results in rotation of the wheel 102 and vice versa, as described below. The rotational resistance of the wheel 102 can be varied to allow the rotation to become easier or more difficult, as described below.

FIGS. 2A and 2B also show that the wheel 202 can include a groove 206. In at least one implementation, the groove 206 can enhance the contact between the cable and the wheel 202. In particular, the groove 206 can increase the surface area of the contact between the cable and the wheel 202. Increasing the surface area of the contact can prevent slipping or other sudden movements of the cable which can be uncomfortable for the user. Additionally or alternatively, the groove 206 can ensure that the cable remains substantially centered relative to the wheel 202.

FIGS. 2A and 2B further show that the pulley 102 can include an attachment 208. In at least one implementation, the attachment 208 can allow the pulley 102 to attach to an external device. For example, the attachment 208 can be connected to the external attachment 114 of FIG. 1. Additionally or alternatively, the attachment 208 can be connected to an external structure, such as a wall, ceiling or floor, or to an external device, such as an exercise or weight machine. The attachment 208 can rotate relative to the wheel 202. This can allow the wheel 202 to be aligned in virtually any direction.

FIGS. 2A and 2B further show that the pulley 102 can include a resistance adjustment 210. In at least one implementation, the resistance adjustment 210 can control the resistance of the pulley 102. In particular, the resistance adjustment can control the resistance of the rotation of the wheel 202 around the axle 204 and the movement of the connected cable. Higher resistance can make for a more difficult exercise routine for the user, while lower resistance can make for an easier exercise routine for the user.

FIGS. 2A and 2B additionally show that the resistance adjustment 210 can include a brake extension 212. In at least one implementation, the brake extension 212 can prevent motion of the cable. In particular, the brake extension 212 can decrease the available space for the motion of the cable. I.e., the cable must pass between the wheel 202 and the brake extension 212. The smaller the space between the wheel 202 and the brake extension 212 the higher the resistance as the cable is trapped between the wheel 202 which rotating and the brake extension 212 which is stationary increasing the friction preventing motion of the cable.

FIGS. 2A and 2B also show that the brake extension 212 can be connected to the attachment 208. In at least one implementation, the attachment 208 can be used to adjust the position of the brake extension 212. In particular, as the attachment 208 is moved a first direction, the brake extension 212 can be moved closer to the wheel 202. In contrast, as the attachment 208 is moved in the opposite direction, the brake extension 212 can be moved further from the wheel 202. For example, the attachment 208 and brake extension 208 can be threaded through the housing of the pulley 102. The user can rotate the attachment 208 relative to the housing, inducing lateral movement of the attachment 208 and the brake extension 212.

Additionally or alternatively, the resistance adjustment 210 can include a brake bar. In at least one implementation, the brake bar can prevent motion of the cable. In particular, the brake bar can decrease the available space for the motion of the cable. I.e., the cable must pass between the wheel 202 and the brake bar. The smaller the space between the wheel 202 and the brake bar the higher the resistance as the cable is trapped between the wheel 202 which rotating and the brake bar which is stationary increasing the friction preventing motion of the cable.

FIGS. 2A and 2B also show that the resistance adjustment 210 can include an adjustment knob. In at least one implementation, the adjustment knob can be used to adjust the position of the brake bar. In particular, as the adjustment knob is moved a first direction, the brake bar can be moved closer to the wheel 202. In contrast, as the adjustment knob is moved in the opposite direction, the brake bar can be moved further from the wheel 202.

One of skill in the art will appreciate that the resistance adjustment 210 can include any mechanism which is configured to make movement of the cable more difficult. For example, the resistance adjustment 210 can include a mechanism that increases resistance to rotation of the wheel 202. E.g., the resistance adjustment can include a resistance tube. The resistance tube can be placed between the wheel 202 and the axle 204. Pressure can expand the resistance tube or otherwise make rotation of the wheel 202 relative to the axle 204 more difficult. The resistance adjustment can include further mechanisms such as those disclosed in the resistance chamber of co-pending U.S. application Ser. No. 13/109,654, filed on May 17, 2011, and entitled, "BALL NEST WITH VARIABLE RESISTANCE FOR FITNESS AND WELLNESS MOVEMENT", previously referenced. Additionally or alternatively, the resistance adjustment can include a screw or other mechanism that acts to decrease the space available for movement of the cable.

Figure 3:
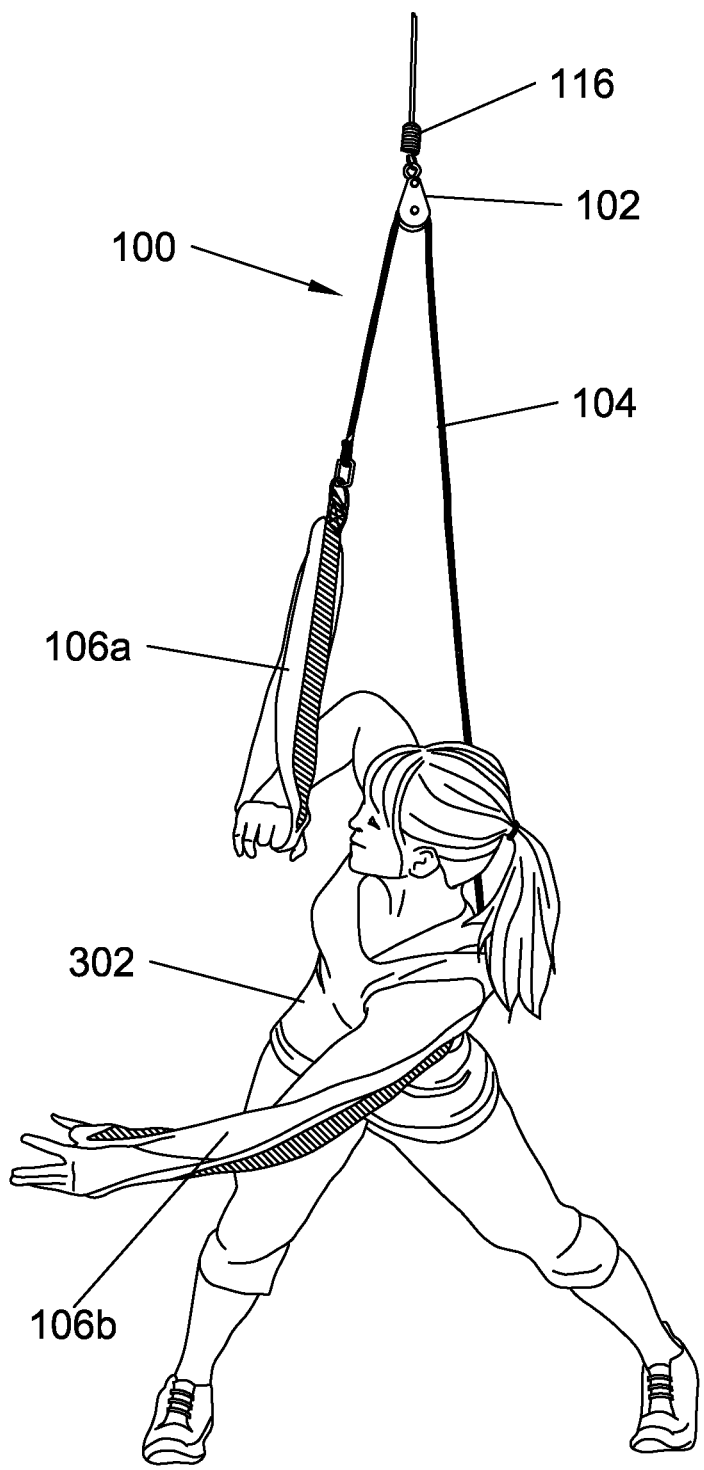
FIG. 3 illustrates an example of a user using the exercise system.

FIG. 3 illustrates an example of a user 302 using the exercise system 100. In at least one implementation, the user 302 can use the exercise system 100 to tone or strengthen his/her muscles. In particular, the exercise system 100 recreates natural movements of the human body, allowing the user 302 to exercise with little or no detrimental impact to the body of the user 302. I.e., the exercise system allows the user 302 to exercise using natural movements and low impact resistance.

FIG. 3 shows that the user 302 can hold the exercise system 100 using the slings 106. In at least one implementation, the user 302 can place one hand on the first sling 106a and the other hand on the second sling 106b. As the user 302 attempts to move the slings 106, the resistance provided by the pulley 102 to movement of the cable 104 can provide resistance to the movement of the slings 106.

FIG. 3 also shows that as the user 302 moves the first sling 106a the second sling 106b moves in an equal but opposite direction and vice versa. I.e., the force applied by the user 302 to the first sling 106a is transmitted by the cable 104 to the pulley 102 which redirects the force to the second sling 106b, and vice versa. For example, if the user 302 pulls on the first sling 106a then the second sling 106b moves away from the user 302. Therefore, an additional component of resistance is imparted by the user 302. Additionally or alternatively, additional resistance can be imparted by an external device, such as the spring 116 or an additional exercise system or weight machine, or resistance to movement of the pulley 102, as described above.

Figure 4:
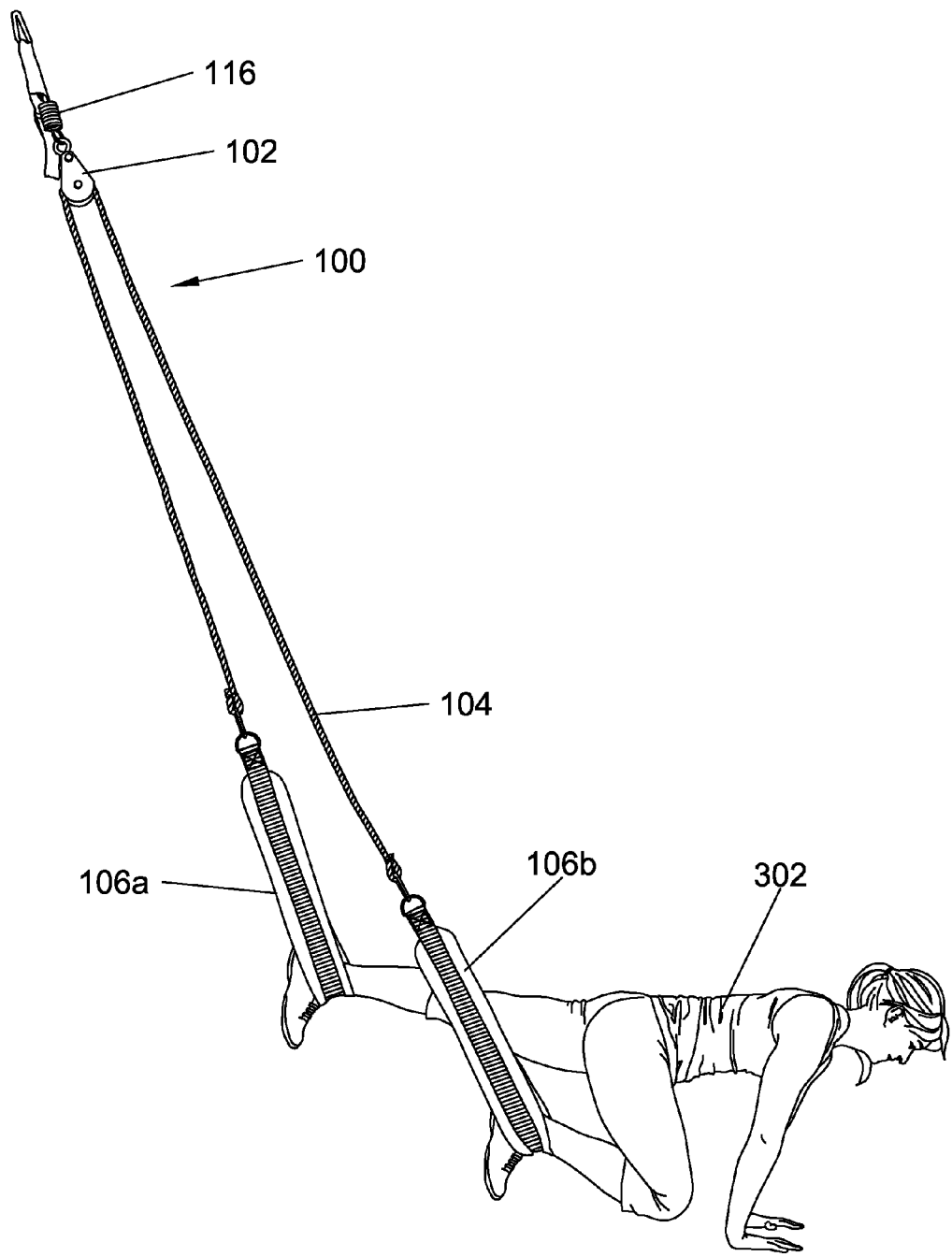
FIG. 4 illustrates an alternative example of a user using the exercise system.

FIG. 4 illustrates an alternative example of a user 302 using the exercise system 100. One of skill in the art will appreciate that the exercise system 100 can be used by the user 302 to perform any number of exercises. The examples provided herein are intended to be illustrative only and are not limiting unless otherwise specified in the claims.

FIG. 4 shows that the user 302 can place his/her feet in the slings 106. In at least one implementation, the user 302 can place one foot the first sling 106a and the other foot in the second sling 106b. As the user 302 attempts to move the slings 106, the resistance provided by the pulley 102 to movement of the cable 104 can provide resistance to the movement of the slings 106.

FIG. 4 also shows that as the user 302 moves his/her first foot, the forces is imparted to the user's second foot and vice versa. I.e., the force applied by the foot of the user 302 to the first sling 106a is transmitted by the cable 104 to the pulley 102 which redirects the force to the second sling 106b and the second foot of the user 302, and vice versa. For example, if the user 302 pulls on the first sling 106a then the second sling 106b moves away from the user 302. Therefore, an additional component of resistance is imparted by the user 302. Additionally or alternatively, additional resistance can be imparted by an external device, such as the spring 116 or an additional exercise system or weight machine, or resistance to movement of the pulley 102, as described above.

In at least one implementation, the user 302 can use a supplemental exercise device, such as a vertical movement vibrating exercise and wellness platform. An example of a vertical movement vibrating exercise and wellness platform is disclosed in co-pending U.S. application Ser. No. 13/109,658, filed on May 17, 2011, and entitled, "VERTICAL MOVEMENT VIBRATING EXERCISE AND WELLNESS PLATFORM", previously presented. In particular, the user 302 must balance himself/herself while performing the exercise routine with the exercise system 100, making the exercise routine more difficult and, consequently, more beneficial to the user.

Additionally or alternatively, the user 302 can use a supplemental exercise device, such as a tri-circular exercise device. An example of a tri-circular exercise device is disclosed in co-pending U.S. application Ser. No. 13/109,666, filed on May 17, 2011, and entitled, "TRI-CIRCULAR EXERCISE DEVICE WITH VARIABLE ROTATION RESISTANCE", previously referenced. In particular, the user 302 can balance himself/herself on the secondary plates or the main plate. However, the secondary plate and/or the main plate are rotating. Therefore, the user 302 must control the movement of the slings 106 while directing the rotation of the secondary plates and/or the main plate, making the exercise routine more difficult and, consequently, more beneficial to the user.

Additionally or alternatively, the user 302 can use other supplemental exercise devices, such as weights or other exercise systems, while using the exercise system 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pulley for providing resistance in an exercise system, the pulley comprising:
 a wheel, wherein the wheel:
  is configured to rotate about an axis; and
  includes a groove, wherein the groove is located along the circumference of the wheel;
 a cable, wherein the cable makes contact with at least a portion of the groove; and
 a resistance adjustment, wherein the resistance adjustment:
  presses the cable against the pulley; and
  is configured to change the force required to rotate the wheel about the axis.

2. The system of claim 1, wherein the resistance adjustment includes a resistance knob, wherein the resistance knob is configured to increase the friction created by the resistance tube.

3. The system of claim 2, wherein the resistance adjustment includes a resistance sleeve, wherein the resistance sleeve is configured to be placed between resistance tube and one of:
 the wheel; and
 the axle.

4. The system of claim 2, wherein:
 the resistance tube includes a portion that is inclined with respect to the major axis of the resistance tube; and
 the adjustment knob includes a portion that is inclined with respect to the major axis of the adjustment knob;
 wherein the inclined portion of the adjustment knob interfaces with the inclined portion of the resistance tube.

5. A system for allowing a user to exercise, the system comprising:
 a pulley;
 a cable, wherein the cable makes contact with at least part of the pulley;
 a resistance adjustment, wherein the resistance adjustment:
  includes a resistance tube, wherein the resistance tube is configured to provide friction between the pulley and an axle; and
  is configured to change the force required to rotate the pulley;
 a sling, wherein the sling:
  is attached to a first end of the cable;
  includes a support, wherein at least a portion of the support forms a loop; and
 an attachment, wherein the attachment is configured to connect the pulley to an external structure.

6. The system of claim 5, wherein the attachment includes a carabiner.

7. The system of claim 5, wherein the cable includes one of:
 metal; or
 nylon.

8. The system of claim 5, wherein the cable is between 2.1 meters and 3.3 meters long.

9. The system of claim 8, wherein the cable is approximately 2.7 meters long.

10. The system of claim 5, wherein the cable includes a carabiner attached to the first end.

11. The system of claim 10, wherein the sling includes a loop, wherein the loop is configured to be attached by the carabiner.

12. A system for allowing a user to exercise, the system comprising:
 a pulley, wherein the pulley includes:
  a wheel, wherein the wheel:
   is configured to rotate about an axis; and
   includes a groove, wherein the groove is located along the circumference of the wheel; and
  a resistance adjustment, wherein the resistance adjustment is configured to change the force required to rotate the wheel about the axis;
 a cable, wherein the cable makes contact with at least part of the groove;
 a first sling, wherein the first sling:
  is attached to a first end of the cable;
  includes:
   a support, wherein at least a portion of the support forms a loop; and
   a body, wherein the body is attached to the loop formed by the support;
 a second sling, wherein the second sling:
  is attached to a second end of the cable;
  includes a support, wherein at least a portion of the support forms a loop; and
  includes a body, wherein the body is attached to the loop formed by the support;
 an attachment, wherein the attachment is attached to the pulley;
 a spring, wherein the spring is attached to the attachment;
 an extension strap, wherein the extension strap is attached to the spring; and
 a secondary attachment, wherein the secondary attachment is configured to connect the extension strap to an external structure.

13. The system of claim 12, wherein resistance adjustment includes a resistance extension.

14. The system of claim 13, wherein resistance extension is connected to the attachment, wherein rotation of the attachment of the pulley is configured to move the resistance extension closer to the wheel.

15. The system of claim 12, wherein the support is between:
 39 centimeters and 49 centimeters long; and
 3 centimeters and 5 centimeters wide.

16. The system of claim 15 wherein the support is approximately:
 44 centimeters long; and
 4 centimeters wide.

17. The system of claim 12, wherein the body is between:
    30 centimeters and 38 centimeters long; and
    8 centimeters and 12 centimeters wide.

18. The system of claim 17, wherein the body is approximately:
    34 centimeters long; and
    10 centimeters wide.

\* \* \* \* \*